United States Patent

Duhaime et al.

[11] Patent Number: 5,330,068
[45] Date of Patent: Jul. 19, 1994

[54] FUEL TANK CLOSURE ASSEMBLY

[75] Inventors: Daniel M. Duhaime, Bloomfield Hills; Mark R. Henault, Dearborn; Daniel J. Kmiecik, Dearborn Heights, all of Mich.

[73] Assignee: Ford Motor Company, Dearborn, Mich.

[21] Appl. No.: 86,070

[22] Filed: Jul. 6, 1993

[51] Int. Cl.⁵ .............................. B65D 53/02
[52] U.S. Cl. .................... 220/304; 220/378; 277/179
[58] Field of Search ............ 220/304, 295, 465, 378, 220/308; 215/352, 345, 341; 277/110, 179, 207 A, 178, 179

[56] References Cited

U.S. PATENT DOCUMENTS

| | | |
|---|---|---|
| 1,157,574 | 10/1915 | Mueller . |
| 1,632,042 | 6/1927 | Price et al. . |
| 2,016,227 | 10/1935 | Clausen ................ 220/304 |
| 2,084,605 | 10/1937 | Webb . |
| 2,107,922 | 2/1938 | Westin . |
| 2,349,587 | 5/1944 | Brand ................ 220/308 |
| 2,647,002 | 7/1953 | Brummer ............ 277/178 |
| 2,676,041 | 4/1954 | Englesson ........... 277/178 |
| 2,901,139 | 8/1959 | Isele-Aregger ...... 215/345 |
| 2,954,374 | 9/1960 | Pryale ................. 215/345 |
| 3,106,406 | 10/1963 | Liebig ................. 277/179 |
| 3,306,622 | 2/1967 | Liebig ................. 277/178 |
| 3,313,440 | 4/1967 | Nofer ................... 215/345 |
| 3,331,611 | 7/1967 | Liebig ................. 277/178 |
| 3,700,136 | 10/1972 | Ruekberg ........... 220/465 |
| 3,722,730 | 3/1973 | Joos .................... 220/378 |
| 3,788,510 | 1/1974 | Collins ................ 220/304 |
| 3,825,147 | 7/1974 | Noponen et al. ... 220/304 |
| 3,942,677 | 3/1976 | Hagen et al. . |
| 3,985,511 | 10/1976 | Betts ................... 220/465 |
| 4,094,460 | 6/1978 | Scanga et al. ...... 215/352 |
| 4,569,637 | 2/1986 | Tuckey . |
| 4,651,701 | 3/1987 | Weaver . |
| 4,694,857 | 9/1987 | Harris . |
| 4,974,570 | 12/1990 | Szwargulski et al. . |
| 5,033,435 | 7/1991 | Ostarello et al. . |
| 5,036,822 | 8/1991 | Kojima . |
| 5,056,492 | 10/1991 | Banse . |

Primary Examiner—S. Castellano
Attorney, Agent, or Firm—Donald A. Wilkinson; Roger L. May

[57] ABSTRACT

A fuel closure assembly is especially useful in multi-layer fuel tanks. An opening in a fuel tank wall having an externally threaded nipple forms a planar sealing surface. An seal is centered about a radial surface of the nipple. A plate closes the opening and is retained in position by a threaded ring.

3 Claims, 1 Drawing Sheet

FUEL TANK CLOSURE ASSEMBLY

BACKGROUND OF THE INVENTION

1. Field of the Invention

The present invention relates to sealing an opening in an automotive fuel tank. More specifically, the invention seals the interface between a multi-layer fuel tank wall using a L-shaped or U-shaped seal.

2. Description of the Related Art

Automotive fuel tanks contain a variety of openings to permit access to the interior of the tank. Among the largest of these openings is the opening to accommodate the fuel delivery module. Fuel delivery modules may be secured to an opening in the fuel tank wall through a circular self-locking cover as exemplified in U.S. Pat. No. 4,569,637 or a mason jar-type threaded retaining ring as exemplified in U.S. Pat. No. 3,942,677. Self-locking covers generally use a flat, cylindrical seal. Mason jar-type covers use O-ring type seals. O-ring and circular seals are not self retaining and self centering about the opening of the fuel tank.

L-shaped washers have been used in plumbing applications to provide both a sealing and a self-retaining feature. An example of an L-shaped washer is illustrated in U.S. Pat. No. 1,157,574. The washer is used to couple one pipe to another. This patent does not address the sealing requirements of automotive fuel tank closure assemblies as are further described below.

SUMMARY OF THE INVENTION

A fuel tank wall closure assembly comprising:
a nipple having a planar sealing surface and a radial locating surface;
a seal having a body and an annular lip, the seal overlies the nipple with the body juxtaposed the planar surface and the lip being retained by the radial surface;
a closure seating with the body of the seal;
and a means retaining the closure against the seal.

The invention is particularly useful in multilayer plastic fuel tanks. The seal is made to overlie the interface between the fuel tank layers. The assembly simultaneously seals the opening of the fuel tank and the interface between the layers. A low cost mason jar type retaining ring secures a closure plate to the opening.

A threaded nipple is formed onto the molded fuel tank wall during the blow-molding process. A planar surface on the nipple receives the seal. An annular lip on the seal engages the perimeter of the nipple and renders the seal self-centering and self-retaining. The self-centering and self-retaining features of the present invention facilitate assembly and reduce the manufacturing costs of the fuel tank.

DESCRIPTION OF THE PREFERRED EMBODIMENTS

Figure 1:
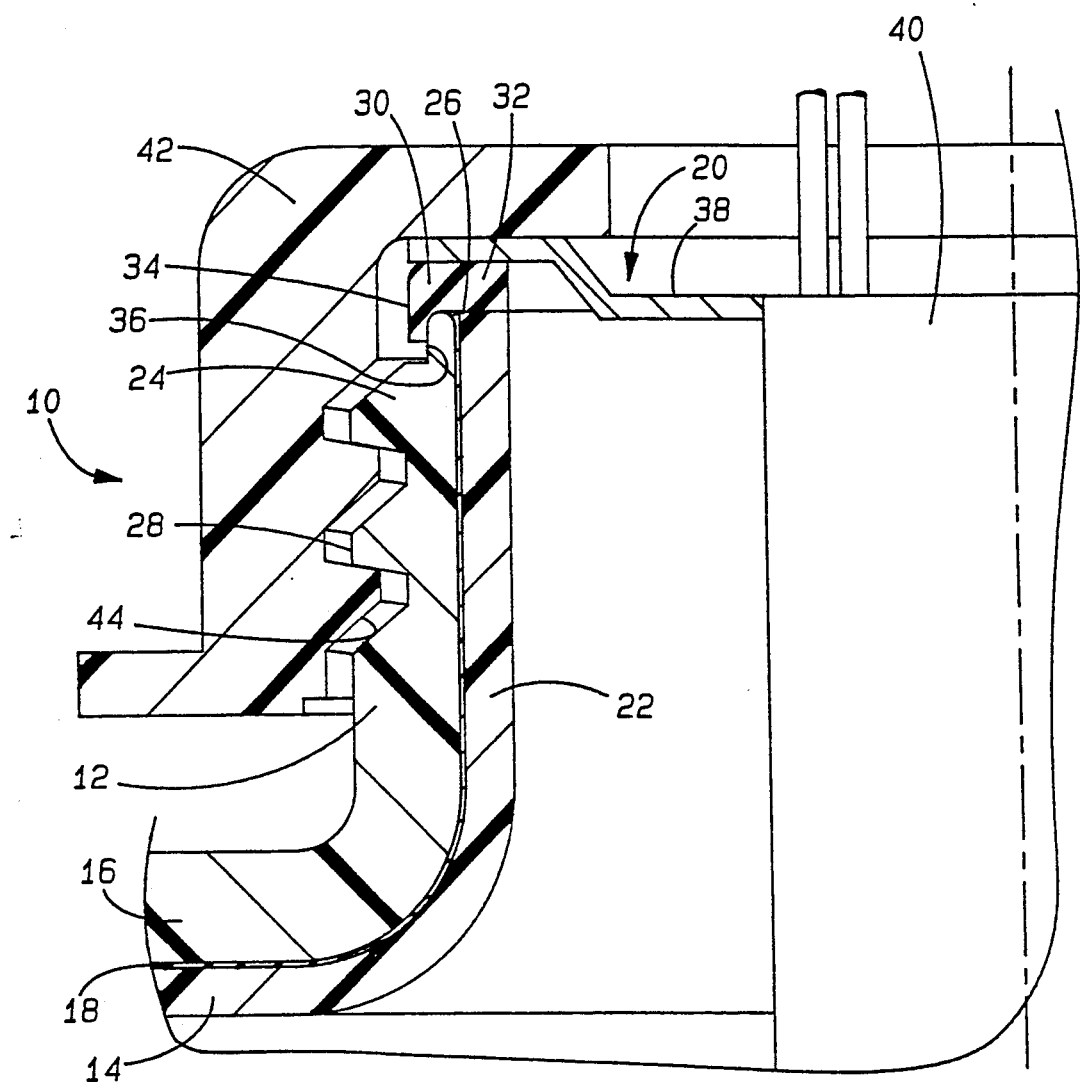
FIG. 1 illustrates a cross-sectional view of the fuel tank closure assembly.
Figure 2:
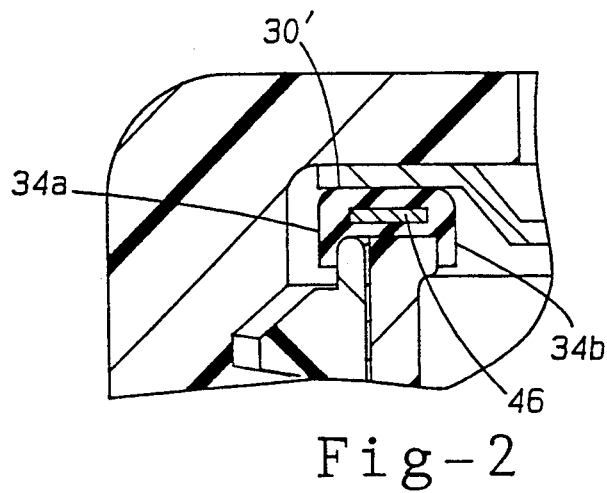
FIG. 2 illustrates an alternative embodiment of the seal.

Illustrated in FIG. 1 is a cross-sectional view of fuel tank closure assembly 10. Assembly 10 closes an opening in fuel tank wall 12. Wall 12 is made from a multi-layer blow-molded plastic parison. Illustrated in FIGS. 1 and 2 is a 3 layer wall construction. Inner and outer layers 14, 16 are made from high density polyethylene (HDPE) as is commonly used in automotive fuel tanks. Barrier layer 18 lies intermediate between layers 14 and 16 and is made from linear low density polyethylene (LLDPE). LLDPE provides resistance to hydrocarbon permeation. An optional tie layer (not shown) between the HDPE and LLDPE may be used to increase the strength of the laminate. Suitable tie layers include nylon or ethel vinyl alcohol (EVOH).

Fuel tanks are generally manufactured by means of a blow-molding process. After the tank is molded, opening 20 is formed in wall 12. Wall section 22 is formed in the shape of nipple 24 having exterior threads. 28. A circular, planar sealing surface 26 contains the interface between layers 14, 16, and 18. Seal 30 is applied atop planar surface 26. Seal 30 comprises a generally flat cylindrical body 32 and annular lip 34. Lip 34 encircles and is retained by radial sealing surface 36. Closure plate 38 seats against body 32. Closure plate 38 seals opening 20 and supports a fuel delivery module 40. Plate 38 is retained securely against seal 30 by retaining ring 42. Internal threads 44 engage threads 28.

Depending on the molding operation, surface 26 may be machined, cut or polished to provide a smooth planar surface for receiving seal 30. The interface between layers 14, 16, and 18 is susceptible to hydrocarbon permeation from within the fuel tank. It is generally not desirable to expose this interface to the interior of the fuel tank.

Assembly 10 is constructed by forming nipple 24 in the shape illustrated. Planar surface 26 is machined smooth to act as a sealing surface. Seal 30 is applied atop nipple 24. Lip 34 engages radial locating surface 36 and centers seal 30 concentric about opening 20. Closure plate 38 is applied atop seal 30. Movement or alignment of closure plate 38 does not twist or move seal 30. Retaining ring 42 is applied atop closure plate 38. Retaining ring 42 is tightened and compresses seal 30 between closure plate 38 and planar surface 26.

Figure 3:
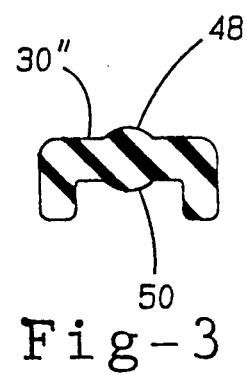
FIG. 3 illustrates another alternative embodiment of the seal.

FIG. 1 illustrates seal 30 having one outer annular lip 34. Illustrated in FIGS. 2 and 3 are alternative seals for use in the present invention. FIG. 2 illustrates seal 30' having two annular lips 34a and 34b. Use of two annular lips 34a and 34b facilitates locating seal 30' concentric about opening 20. Support 46, within seal 30', provides rigidity to seal 30' and facilitates the assembly process. Support 46 makes seal 30' self-supporting and aids in maintaining a planar and a circular shape.

Illustrated in FIG. 3 is seal 30" having raised portions 48, 50. Portions 48, 50 provide additional sealing under the same compression load as a flat seal. Portions 48, 50 may be on either the top, bottom or both surfaces as illustrated in FIG. 3.

The invention has been described as an assembly for closing the access opening for fuel delivery modules. The invention is useful as a means for closing other openings in a fuel tank.

What is claimed is:

1. A fuel tank closure assembly comprising:
   a fuel tank wall having a nipple, with the nipple including a planar sealing surface and at least one radial locating surface;
   an annular seal having an annular body and at least one annular lip, said seal mounted on said nipple with said body overlying said planar sealing surface and said lip being retained by said radial surface;

a closure overlying said body of said seal;

means for retaining said closure against said seal; and a support substantially enclosured within said seal whereby said seal will maintain a substantially planar and circular shape during mounting of said seal onto said nipple.

2. The fuel tank closure assembly of claim 1 wherein said at least one radial locating surface comprises two radial locating surfaces on said nipple and said at least one annular lip comprises two annular lips being retained by said two radial locating surfaces.

3. The assembly of claim 1 wherein said wall comprises multiple layers having at least one interface between said layers and said planar surface contains said interface whereby said body of said seal will seal along said at least one interface along said planar surface when said closure is retained against said seal.

* * * * *